Inventor
H. C. Calhoun.

UNITED STATES PATENT OFFICE.

HENRY C. CALHOUN, OF DETROIT, MICHIGAN.

WHEEL STRUCTURE.

1,227,381.  Specification of Letters Patent.  Patented May 22, 1917.

Application filed September 20, 1916. Serial No. 121,243.

*To all whom it may concern:*

Be it known that I, HENRY C. CALHOUN, a citizen of the United States, residing at Detroit, in the county of Wayne and State of Michigan, have invented certain new and useful Improvements in Wheel Structures, of which the following is a specification.

My invention relates to new and useful improvements in wheels and more particularly in wheels for motor vehicles, the primary object of my invention being the construction of an all metal expanded wheel adapted to receive demountable rims.

A further object of my invention consists in providing a wheel of the above described character which will be simple and economical in construction, durable and efficient in use and at the same time will be light and which will present a neat appearance.

In this connection, a further object of my invention consists in providing a wheel construction in which the hub proper may be cast in a single piece from any suitable metal and in which the remainder of the wheel is formed from sheet metal in such a manner that it may be stamped out and shaped by the employment of the proper dies.

Another object of my invention resides in providing a wheel structure in which two series of spaced spokes are employed, the spokes of each series being formed integral with hub receiving rings and with felly forming rings, the felly forming rings being secured to each other during the manufacture of the wheel and the hub receiving rings being mounted upon the hub of the wheel in such a manner that one may be moved away from the other to properly tension the spokes when manufacturing the wheel.

A still further object of my invention consists in providing suitable means for mounting and securing a demountable rim upon a wheel of the above described character.

With these and other objects in view, my invention will be more fully described, illustrated in the accompanying drawings, and then specifically pointed out in the claims which are attached to and form a part of this application.

In the drawings:

Figure 1 is a side elevation of a wheel constructed in accordance with my invention, showing the rim in place;

Fig. 2 is a front elevation of the wheel, a portion of the wheel spokes and the rim being shown in section to more clearly illustrate the construction;

Fig. 3 is a fragmentary section taken radially of the hub and wheel, showing certain details in construction;

Fig. 4 is a fragmentary section on the line 4—4 of Fig. 3;

Fig. 5 is a fragmentary radial section through the felly portion of the wheel and the rim, showing the driving lug connection between the wheel and rim;

Fig. 6 is a fragmentary side elevation illustrating the construction shown in Fig. 5;

Figure 10:
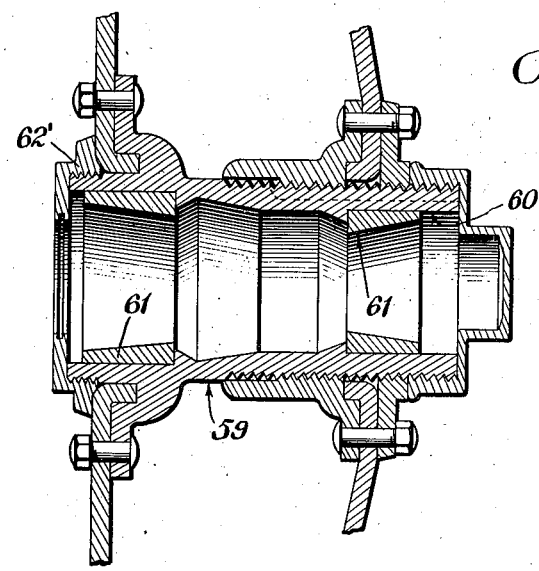
Fig. 10 is a central longitudinal sectional view of a modified form of hub construction employed in the manufacture of forward wheels of vehicles, the hub shown in Fig. 3 being employed in the manufacture of driving wheels.

Corresponding and like parts are referred to in the following description and indicated in all the views of the drawings by the same reference characters.

My improved all metal wheel construction includes a substantially cylindrical hub 10 formed at one end with a cylindrical socket or recess 12 to receive the ball bearing ring 13 and at its other end with an annular recess 14 in which the spindle securing nut of a live axle section may seat, the portion between these recesses being formed with a reduced frusto-conical spindle receiving bore 15 having the usual keyway 16. The hub is threaded throughout a considerable portion of its length at one end, as shown at 17, and slightly threaded at its other end, as shown at 18. A combined retainer gland and lock nut 19 is threaded upon this latter end to engage against the body of a brake drum 20 and hold it in place, as will be later apparent. The central bore of this gland is of less diameter than the internal diameter of the bearing ring 13 and is provided with an annular gland 21 to receive a packing ring of felt or other suitable material in order to prevent escape of grease from the hub about the spindle. A dust cap 22, of the usual or any preferred type, is threaded upon the opposite end of the hub. This hub adjacent the brake drum receiving end is provided with a radially extending annular flange 23, the inner face of which is undercut to provide an annular channel 24 directly encircling the wheel hub. The above described hub may be cast in a single piece from any suitable metal, such as steel and all other parts of my improved wheel construction, save certain clamping lugs, bolts and like fastening devices, are formed from sheet metal of suitable weight and may, therefore, be stamped and shaped by the employment of proper dies and forms.

The remainder of the wheel includes, broadly speaking, an inner section 25 and outer section 26. Each of these sections is stamped in a single piece from sheet metal, preferably steel, and each section provides a hub receiving ring, a felly forming ring and a plurality of spokes. The hub receiving ring portion 27 of the wheel section 25 is formed with a central hub receiving opening surrounded by a laterally directed annular flange 28 adapted to seat in the annular channel 24 of the hub in order that the hub ring 27 may be clamped against such flange by bolts 29 passed through the body of the brake drum, through the hub receiving ring and flange 23 and secured by nuts 30. The combined gland and lock nut 19 engaging against the brake drum as it does also serves to additionally anchor the flange of the hub receiving ring portion in the channel of the hub flange.

The spokes of this wheel forming section are, of course, provided by stamping away portions of the metal from which the section is formed and any desired number of spokes of any dimensions may be provided. The outer peripheral edge of the section 25 is outbent to provide an inner frusto-conical portion 31, and a cylindrical rim seat forming portion 32 having a marginal outwardly directed retaining flange 33, all of such portions extending entirely about the wheel and constituting one member of the compound wheel felly which my construction provides.

The felly forming ring portion of the other section 26 is rebent upon itself to provide, with that portion of the felly forming ring of the other section adjacent the portion 31 thereof, an annular tubular felly proper 34 square in cross section with its outer face concentric with but spaced within the outer face of the cylindrical portion 32 of the section 25. Those portions of the felly forming rings immediately within this felly proper are welded together to a point indicated in dotted lines in Fig. 3 and are further secured by rivets 35.

Threaded upon the outer end of the hub 10 is a spreader ring 36 having a radial flange 37 undercut to provide an annular channel 38 directly about the hub and the hub receiving ring of the outer section 26 is formed with an opening to receive the hub surrounded by an inturned annular flange 39 seating in this channel 38. A locking ring 40 is threaded upon the hub and is formed with a radial flange 41 to engage the outer face of the hub receiving portion of the outer section 26 so that such portion will be clamped between the flanges 37 and 41. These flanges and the hub receiving ring portion interposed between them are formed with alined openings to receive bolts having nuts which correspond to the bolts and nuts 29 and 30 and which are given the same characters. The locking ring 40 also serves as a stop for the dust cap 32 and both the spreader ring 36, flange 39 and locking ring 40 are formed with grooves or channels which in assembled position of the parts aline to provide a keyway which, together with a keyway formed in the hub, receives a key 42 so that the various rings are locked against turning movement.

In assembling the above described parts upon the hub, the spreader ring 36 is first turned onto the hub to the intermediate portion thereof and the outer wheel forming section 26 is applied to seat its flange within the channel of the spreader ring, this being done before the felly sections have been united. After the felly sections have been united, the spreader ring 36 is turned to force the hub receiving portion of the section 26 away from the corresponding portion of the section 25 to properly tension the spokes, that is, to bring the parts to the position shown in Fig. 3, after which the locking ring 40 is applied and the bolts secured. This method of assembling the parts forms no part of my present invention but is described in more detail in a copending application filed by me September 20, 1916 and bearing the Serial No. 121,242 which relates solely to the method employed and apparatus used in constructing a wheel of this character. Any more detailed explanation is, therefore, believed to be unnecessary, although it might be well to note that the bore or opening 43 formed in the body of the brake drum 20 is solely for the purpose of applying certain apparatus for manipulating the spreader ring 36 and has nothing to do with the wheel construction itself.

Figure 9:
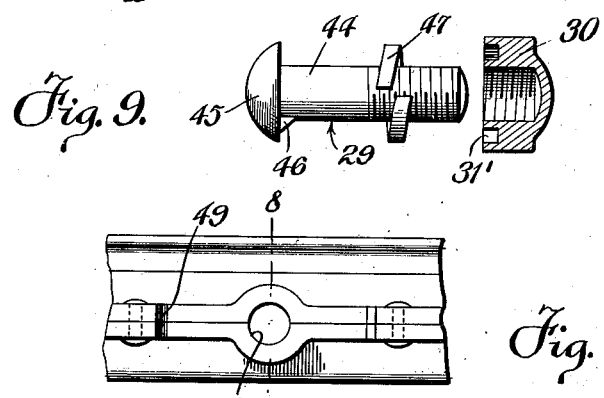
Fig. 9 is an unassembled perspective view of a bolt, lock washer and nut construction employed in securing the body portions of the wheel to the hub.

As best shown in Fig. 9, I employ a somewhat novel form of bolt and nut construction for securing the wheel forming sections to the hub and rings carried thereby. This bolt 29 includes the cylindrical threaded shank 44 and rounded head 45. The shank adjacent the head is formed with a radial stop 46 adapted to seat in a notch formed in the head engaging members of the wheel to hold the bolt against rotation and a split helical spring washer 47 is provided to lock the cap nut 30 against displacement. This cap nut is preferably formed with an annular groove 31' to receive the washer so that it may be turned up against the adjacent part of the wheel to hide the washer from view. The bolt receiving openings in the hub receiving portions of the wheel forming sections 25 and 26 should be so arranged that the spokes of the two sections will be in line with each other in order that the wheel may present as neat and open an appearance as possible.

Figure 7:
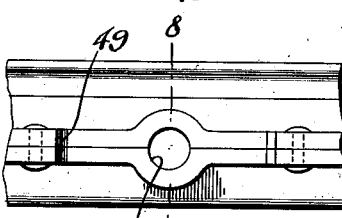
Fig. 7 is a fragmentary plan view of an inner portion of the wheel felly, showing the provision for the valve stem of the inner tube;
Figure 8:
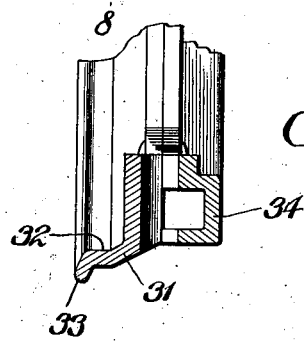
Fig. 8 is a section on the line 8—8 of Fig. 7.

The welded portions of the felly forming sections of the wheel at one point are bent outwardly away from each other before the welding to provide a cylindrical opening 48 through the felly from its inner to its outer face for the passage of the valve stem of a pneumatic inner tube when the wheel is in use and the inner edges of the felly forming rings are preferably cut-away somewhat at either side of this bore, as shown at 49, so that a valve stem of relatively short length may be employed and its valve cap and dust cap still be applied. This construction is clearly illustrated in Figs. 1, 7 and 8.

The free edge of the outer ring portion of the felly proper 34 at a point diametrically opposite the cutaway portion 49 is cut-away to receive the stem portion 50 of a T-shaped bracket 51, the head of which is in the form of an arcuate plate seating against the outer face of the felly and cut-away transversely intermediate its length to provide the opposed undercut locking shoulders 51', which in turn constitute the drive lugs of the felly and which seat between them the drive lugs 52 formed upon the inner face of the demountable rim 53 adjacent its ends. This construction insures against any slipping of the rim circumferentially about the felly. The stem portion 50 of this bracket is secured by rivets 54 in the manner shown in Fig. 5.

The rim may be of the usual or any preferred type of demountable rim and is secured to the felly by locking lugs 55 in the usual manner. These locking lugs include substantially rectangular shaped body portions provided at their inner ends with relatively shallow felly engaging abutment shoulders 56 and adjacent their other ends with wedging flanges 57 adapted to engage between the felly proper and rim to force it against the felly flange 33 and to properly centralize the rim with respect to the felly, these lugs having rim engaging shoulders 58 which hold the rim against outward movement from the felly.

The bolts 58' which, together with the nuts 59', secure the locking lugs in place have their shanks passed through both sides of the felly proper 34 with their heads welded or otherwise secured in the felly forming portion of the wheel section 25, as shown in Fig. 3. If desired, provision may be made for supplying oil to the ball bearings at the hub by means of a lubricant passage 62 provided at its outer end with any suitable check valves 63.

In Fig. 10 of the drawings, I have illustrated a modified form of hub construction for use in the manufacture of the front wheels of motor vehicles. In this figure, the hub 59 is formed at each end with annular recesses 60 to receive the frusto-conical ball bearing rings 61. As far as the exterior formation of the hub is concerned and the manner of connecting the rest of the wheel with it, the construction is the same as that previously described, with the exception that the combined packing gland and lock nut 62', when threaded upon the hub, engages directly against the inner wheel section 25, no brake drum, of course, being employed.

Although I have illustrated and described my wheel construction in all its details, it will of course be understood that I reserve the right to make any changes, within the scope of the appended claims, without in the slightest degree departing from the spirit of my invention.

Having thus described the invention, what is claimed as new is:

1. An all metal wheel including inner and outer wheel forming portions each having a central spoke ring formed with a hub receiving opening surrounded by an inwardly directed annular flange, a hub adapted to engage in the openings, a flange formed upon the hub and having an undercut channel to seat the flange of one of the wheel forming portions, and rings threaded upon the hub upon opposite sides of the other wheel forming portion, one of the latter rings having a channel to seat the flange of the adjacent wheel forming portion.

2. In an all metal wheel, inner and outer disk-shaped body members of sheet metal stamped and formed to provide hub receiving rings having inwardly directed annular flanges and inner and outer series of spokes and a rim receiving felly, a hub engaging through the rings and having an integral flange connected to the flange of one ring, and means adjustable longitudinally of the hub for clamping engagement with the other ring.

3. In an all metal wheel, inner and outer disk-shaped body members of sheet metal stamped and formed to provide hub receiving rings having inwardly directed annular flanges an inner and outer series of spokes and a rim receiving felly, a hub engaging through the rings and having an integral flange connected to the flange of one ring, and means adjustable longitudinally of the hub for clamping engagement with the other ring, said means being capable of spreading the hub receiving rings away from each other.

4. In an all metal wheel construction, a hub, inner and outer wheel body forming rings anchored at their inner edges to the hub and stamped out to provide inner and outer series of spokes, the outer edges of the rings being bent and secured together forming a demountable rim receiving felly, the inner ring having its peripheral edge bent outwardly to provide a frusto-conical portion, and a cylindrical rim seat forming portion having an outwardly directed rim engaging flange and the peripheral edge of the other ring being bent upon itself to coöperate with that portion of the first ring adjacent the frusto-conical portion to provide an annular tubular felly proper substantially square in cross section.

5. In an all metal wheel construction, a hub, inner and outer wheel forming rings anchored at their inner ends to the hub and stamped out to provide inner and outer series of spokes, the free edges of the rings being bent and secured together forming a demountable rim receiving felly, the inner ring having its peripheral edge bent outwardly to provide a frusto-conical portion, and a cylindrical rim seat forming portion having an outwardly directed rim engaging flange and the peripheral edge of the other ring being bent upon itself to coöperate with that portion of the first ring adjacent the frusto-conical portion to provide an annular tubular felly proper substantially square in cross section with its outer peripheral face concentric with but of slightly less radius of curvature than the cylindrical rim forming portion of the first ring.

6. In an all metal wheel construction, a hub externally threaded at its ends and provided adjacent one end with an annular flange, an inner wheel forming member of sheet metal engaging about such end of the hub and abutting against the flange, a brake drum engaging about the hub and abutting against the said member, a combined gland and lock nut threaded about the hub and abutting the brake drum, and an outer wheel forming member of sheet metal secured to the opposite end portion of the hub.

7. In an all metal wheel construction, a hub externally threaded at its ends and provided adjacent one end with an annular flange, an inner wheel forming member of sheet metal engaging about such end of the hub and abutting against the flange, a brake drum engaging about the hub and abutting against the said member, a combined gland and lock nut threaded about the hub and abutting the brake drum, an outer wheel forming member of sheet metal engaging about the opposite end of the hub, a spreader ring threaded upon the hub and abutting against the inner face of such member, a locking ring threaded upon the hub and abutting against the outer face of such member, fastening means passed through the rings and member, and a key seating in a keyway formed in the hub and in both rings and the member.

In testimony whereof I affix my signature.

HENRY C. CALHOUN. [L. S.]